United States Patent
Petts

(10) Patent No.: US 11,890,689 B2
(45) Date of Patent: Feb. 6, 2024

(54) BANDSAW BLADE ANGLE ADJUSTMENT ASSEMBLY

(71) Applicant: Dale Petts, Hales Location, NH (US)

(72) Inventor: Dale Petts, Hales Location, NH (US)

(*) Notice: Subject to any disclaimer, the term of this patent is extended or adjusted under 35 U.S.C. 154(b) by 247 days.

(21) Appl. No.: 17/326,523

(22) Filed: May 21, 2021

(65) Prior Publication Data

US 2021/0362254 A1 Nov. 25, 2021

Related U.S. Application Data

(60) Provisional application No. 63/028,869, filed on May 22, 2020.

(51) Int. Cl.
*B23D 55/08* (2006.01)
*B23D 59/00* (2006.01)

(52) U.S. Cl.
CPC ......... *B23D 55/084* (2013.01); *B23D 59/002* (2013.01)

(58) Field of Classification Search
CPC .............................. B23D 55/084; B23D 55/00
See application file for complete search history.

(56) References Cited

U.S. PATENT DOCUMENTS

| | | | | |
|---|---|---|---|---|
| 3,680,417 A * | 8/1972 | Wells | ................... | B23D 55/084 83/62.1 |
| 4,023,448 A | 5/1977 | Bertini | | |
| 4,085,636 A * | 4/1978 | Eklund | ................ | B23D 55/084 83/72 |
| 4,127,045 A * | 11/1978 | Blucher | ............... | B23D 55/088 83/820 |
| 4,237,757 A * | 12/1980 | Bonac | .................... | B23D 55/10 83/820 |
| 4,546,682 A * | 10/1985 | Howard | ............... | B23D 53/045 83/13 |
| 4,558,614 A * | 12/1985 | Harris | .................. | B23D 55/088 83/788 |
| 4,674,374 A * | 6/1987 | Sadahiro | ............. | B23D 59/006 83/72 |
| 4,766,790 A * | 8/1988 | Harris | .................. | B23D 59/008 83/72 |
| 5,115,403 A * | 5/1992 | Yoneda | ................ | B23D 55/088 702/41 |
| 5,176,055 A * | 1/1993 | Wijesinghe | ............ | B23D 55/06 83/72 |
| 6,212,437 B1 * | 4/2001 | Harris | .................. | B23D 59/001 83/73 |
| 2006/0102682 A1 | 5/2006 | Etter et al. | | |

(Continued)

OTHER PUBLICATIONS

International Search Report dated Aug. 24, 2021 From Corresponding PCT Application No. PCT/US21/33616.

*Primary Examiner* — Sean M Michalski
(74) *Attorney, Agent, or Firm* — Duquette Law Group

(57) ABSTRACT

Embodiments of the innovation relate to a blade angle adjustment assembly, comprising a blade angle adjustment mechanism; a tooth load indicator; and a blade angle controller disposed in electrical communication with the blade angle adjustment mechanism and with the tooth load indicator. The blade angle controller is configured to receive a tooth load indication signal from the tooth load indicator and, the tooth load indication signal, provide a drive signal to the blade angle adjustment mechanism to adjust an angular positon of a bandsaw blade within a cut plane of a workpiece.

22 Claims, 17 Drawing Sheets

(56) References Cited

U.S. PATENT DOCUMENTS

| | | | |
|---|---|---|---|
| 2006/0144202 A1* | 7/2006 | Tokiwa | B23D 59/001 83/76 |
| 2009/0126549 A1* | 5/2009 | Dietz | B23D 55/084 83/56 |
| 2011/0296971 A1* | 12/2011 | Rudolph | B23D 55/084 83/820 |
| 2013/0314007 A1* | 11/2013 | Yanagihara | H02P 6/28 318/400.13 |
| 2015/0020660 A1* | 1/2015 | Jeng | B23D 59/001 83/74 |
| 2015/0158097 A1* | 6/2015 | Myrfield | B23Q 15/12 83/403.1 |
| 2016/0303670 A1 | 10/2016 | Harris | |
| 2017/0225246 A1 | 8/2017 | Page | |
| 2018/0169776 A1* | 6/2018 | Chiao | B23D 59/001 |
| 2021/0394289 A1* | 12/2021 | Stolzer | B23D 55/00 |

* cited by examiner

BANDSAW BLADE ANGLE ADJUSTMENT ASSEMBLY

RELATED APPLICATIONS

This patent application claims the benefit of U.S. Provisional Application No. 63/028,869, filed on May 22, 2020, entitled, "Bandsaw Blade Angle Adjustment Assembly," the contents and teachings of which are hereby incorporated by reference in their entirety.

BACKGROUND

Saw blades, such as bandsaw blades, are used to cut materials to a desired size with a minimum of material waste and energy consumption. Variables that can affect saw blade performance include, for example, the number of tooth points engaged at any point in a cut, the beam strength of the saw blade backing steel, the speed at which the teeth are traveling, and the power or pressure necessary or available to force the teeth to penetrate the material being cut.

Certain bandsaw machines include a bandsaw blade looped about a pair of drive wheels and a pair of fixed guide arms to hold the saw bandsaw blade in position during operation. The bandsaw machine can dispose the bandsaw blade in a horizontal, vertical, or angled orientation relative to a workpiece. With such positioning, as the bandsaw machine passes the saw blade through the workpiece material, it can maintain the saw blade in its original plane.

Bandsaw machines can utilize relatively heavy pressure for relatively difficult to cut materials in order for the bandsaw teeth to be able to penetrate the material and form chips. For bandsawing, cutting pressure is generated by the guide arms and is limited by the strength of the blade (e.g., its beam strength). If the bandsaw machine pushes the saw blade beyond its ability to have the teeth remain in a perfectly straight cut path, the saw blade will yield and a crooked cut will result. One conventional way to improve penetration and reduce crooked cuts is to alter the geometry of the back edge of the bandsaw blade in order to generate a rocking motion in the saw blade. As the non-straight back (e.g., wave back) edge passes by the stationary guide arms, such interaction causes the saw blade to pivot against the top guides in the guide arms, thus altering the cutting plane of the blade within the cut. Altering the cutting plane, causes certain teeth to push harder into the workpiece material and fewer teeth become engaged in the cutting path at the bottom of the cut. When fewer teeth are engaged, they can penetrate the material successfully.

SUMMARY

Conventional bandsaw machines can suffer from a variety of deficiencies. For example, bandsaw machines can include sensors and load measuring systems in order to detect the pressure applied by the bandsaw blade on a workpiece and to regulate feed rates to mitigate crooked cutting or stripping teeth when there is too much pressure. However, a reduction in feed rates can cause the cut rate to slow, thereby negatively affecting productivity. Additionally, bandsaw machines can utilize wave back bandsaw blades to generate a rocking motion in the saw blade relative to a workpiece. However, conventional wave-back blade can wear out in areas of highest stress when cutting.

In addition, there are two points of weakness during a cutting process where saw blade teeth can be at risk for failure—at the start of the cut and the very bottom of the cut. The teeth often chip at the exit because of the very narrow cross-section causing straddle combined with the radius of the surface pulling the teeth toward the bottom of the cut.

By contrast to conventional bandsaw machines, embodiments of the present innovation relate to a bandsaw blade adjustment assembly configured to improve performance of bandsawing operations by progressively varying the cutting path of a bandsaw blade. The bandsaw blade adjustment assembly includes a blade angle adjustment mechanism and one or more feedback sensors which provide information to a controller. The controller, in turn, can optimize the position of the blade angle adjustment mechanism to increase, decrease, or cease wave activation of the bandsaw blade. For example, the controller can alter the blade angle adjustment mechanism to adjust both the cut path of the saw blade and the magnitude of the cutting plane based on the feedback received from the sensor during operation. Varying the cut path of the sawblade can enhance bandsaw machine performance and productivity by providing a continuously variable area of tooth contact which provides substantially greater tooth penetration and improved cutting rates. Also, the starting locations of wave motion throughout the blade become variable thereby creating more even wear on the bandsaw blade teeth during operation, thereby extending bandsaw blade life relative to conventional variable cut path products and methods.

Embodiments of the innovation relate to a blade angle adjustment assembly, comprising a blade angle adjustment mechanism; a tooth load indicator; and a blade angle controller disposed in electrical communication with the blade angle adjustment mechanism and with the tooth load indicator. The blade angle controller is configured to receive a tooth load indication signal from the tooth load indicator and, the tooth load indication signal, provide a drive signal to the blade angle adjustment mechanism to adjust an angular positon of a bandsaw blade within a cut plane of a workpiece.

Embodiments of the innovation relate to a bandsaw machine, comprising: a frame; a first saw blade guide arm carried by the frame; a second saw blade guide arm carried by the frame, the second saw blade guide arm spaced from the first saw blade guide arm; a bandsaw blade carried by the first saw blade guide arm and the second saw blade guide arm; and a blade angle adjustment assembly. The blade angle adjustment assembly comprises a blade angle adjustment mechanism coupled to the frame; a tooth load indicator; and a blade angle controller disposed in electrical communication with the blade angle adjustment mechanism and with the tooth load indicator, the blade angle controller configured to: receive a tooth load indication signal from the tooth load indicator, and based upon the tooth load indication signal, provide a drive signal to the blade angle adjustment mechanism to adjust an angular positon of the bandsaw blade within a cut plane of a workpiece.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the present innovation relate to a bandsaw blade adjustment assembly configured to improve performance of bandsawing operations by progressively varying the cutting path of a bandsaw blade. The bandsaw blade adjustment assembly includes a blade angle adjustment mechanism and one or more tooth load indicators, such as sensors, which provide information to a blade angle controller. The blade angle controller, in turn, can optimize the position of the blade angle adjustment mechanism to increase, decrease, or cease wave activation of the bandsaw blade. For example, the blade angle controller can alter the blade angle adjustment mechanism to progressively adjust both the cut path of the saw blade and the magnitude of the cutting plane based on the feedback received from the tooth load indicator during operation. Varying the cut path of the sawblade can enhance bandsaw machine performance and productivity by providing a continuously variable area of tooth contact which provides substantially greater tooth penetration and improved cutting rates. Also, the starting locations of wave motion throughout the blade become variable thereby creating more even wear on the bandsaw blade teeth during operation, thereby extending bandsaw blade life relative to conventional variable cut path products and methods.

Figure 1:
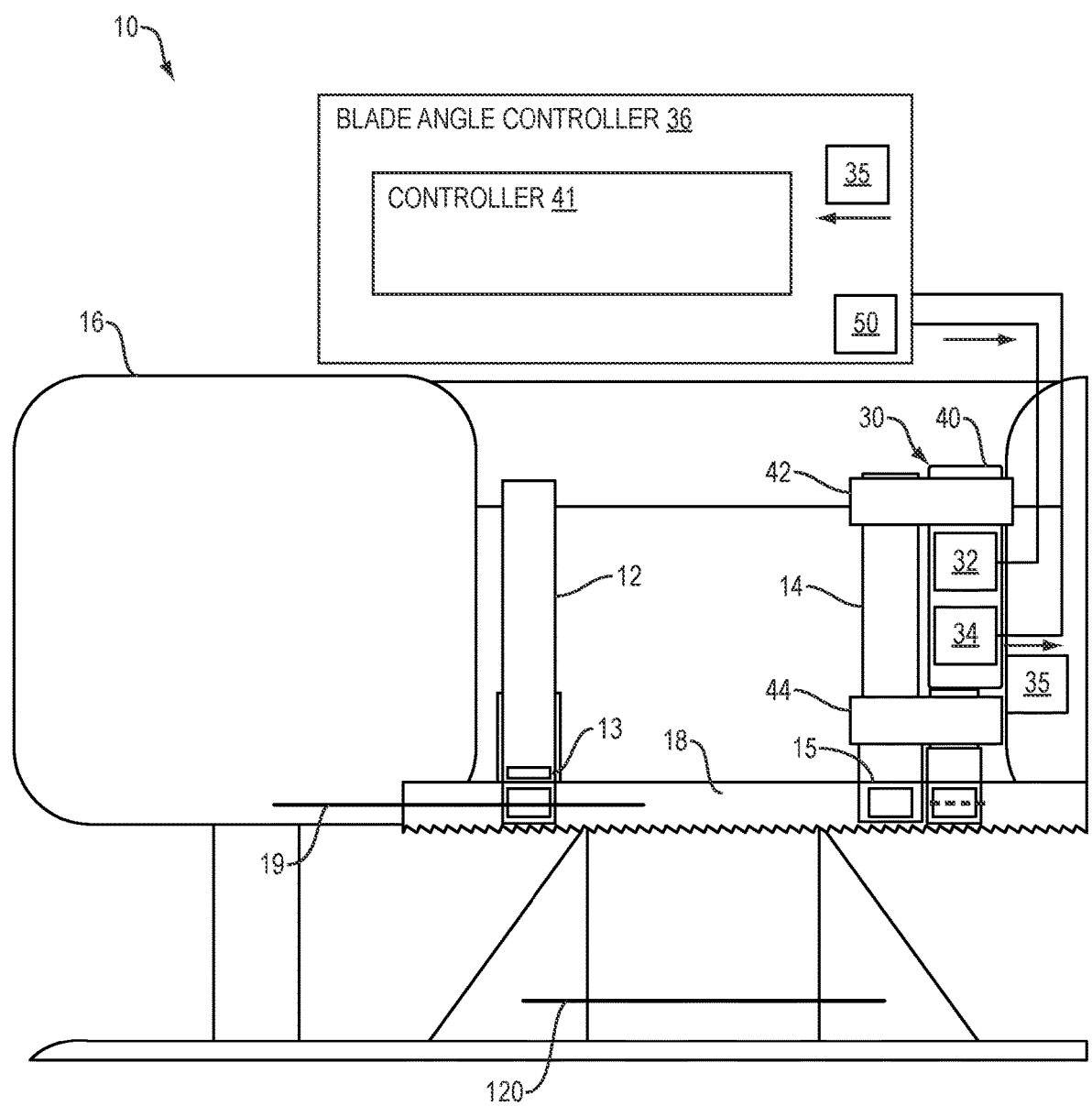
FIG. 1 illustrates a bandsaw machine having a blade angle adjustment assembly, according to one arrangement.

FIG. 1 illustrates a bandsaw machine 10, according to one arrangement. As illustrated the bandsaw machine 10 includes a first saw blade guide arm 12 and a second saw blade guide arm 14 spaced from the first arm, each of which being carried by a frame 16. The first and second saw blade guide arms 12, 14 are configured to support a back edge of a bandsaw blade 18 via respective first and second guide assemblies 13, 15 as the bandsaw machine 10 advances the bandsaw blade 18 through a workpiece. The bandsaw machine 10 also includes a blade angle adjustment assembly 30 configured to adjust the rotational or angular positon of the bandsaw blade 18 relative to the workpiece during a cutting procedure.

The blade angle adjustment assembly 30 includes a blade angle adjustment mechanism 32 coupled to the frame 16, as well as a tooth load indicator 34 configured to identify loading condition experienced by the teeth of the bandsaw blade 18 during operation via a tooth load indication signal 35. The blade angle adjustment assembly 30 also includes a blade angle controller 36 disposed in electrical communication with the blade angle adjustment mechanism 32 and with the tooth load indicator 34.

The blade angle controller 36 is configured to drive the blade angle adjustment mechanism 32 to adjust an angular positon of the bandsaw blade 18 within a cut plane of a workpiece based upon the tooth load indication signal 35 received from the tooth load indicator 34. In one arrangement, the blade angle controller 36 can be a computerized device having a controller 41, such as a processor and a memory, and can be configured to generate the drive signal 50 based upon the tooth load indication signal 35 and a machinability attribute of a workpiece to be cut by the bandsaw blade 18. For example, conventional workpieces can have a variety of geometries and can be made from a variety of materials. These geometries and materials can define the machinability attribute of the workpiece.

Figure 2A:
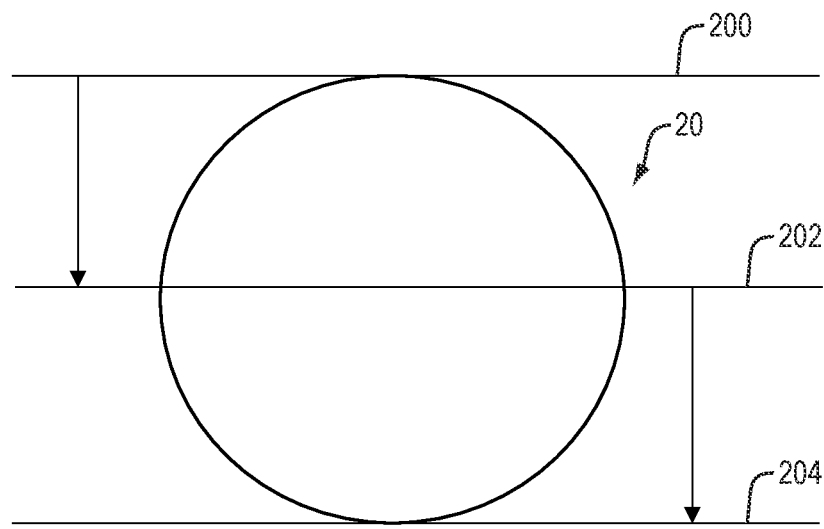
FIG. 2A illustrates an example of a workpiece having a solid, circular cross-sectional area.

For example, FIG. 2A illustrates a workpiece 20 having a solid, circular cross-sectional area and which is manufactured from a metal material, such as steel. As a horizontally-disposed bandsaw blade 18 advances through the workpiece 20 from an entry location 200 to a midpoint location 202, the volume of workpiece material encountered by the bandsaw blade 18 increases. As such, the bandsaw blade 18 can experience both an increase in tooth load and a decrease in cutting rate. Further, as the bandsaw blade 18 advances through the workpiece 20 from the midpoint location 202 to an exit location 204, the volume of workpiece material encountered by the bandsaw blade 18 decreases. As such, the bandsaw blade 18 can experience both decrease in tooth load and an increase in cutting rate.

Figure 2B:
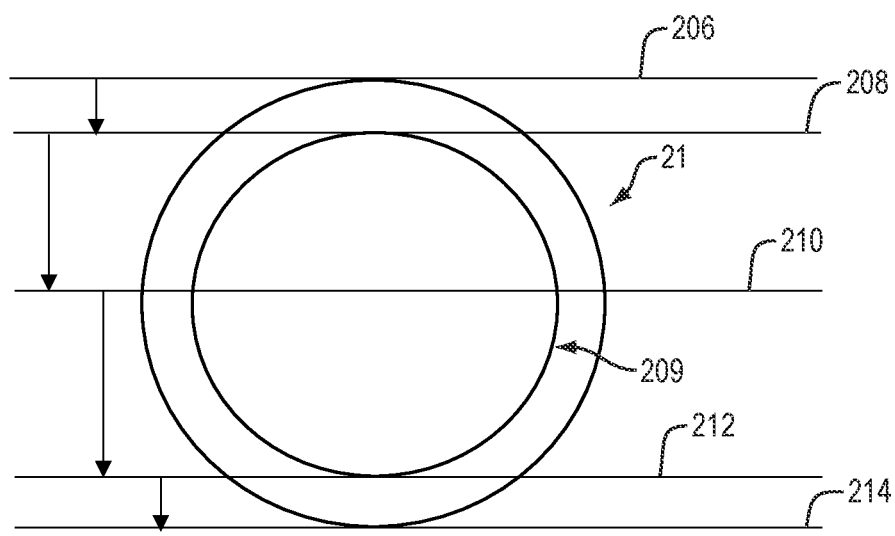
FIG. 2B illustrates an example of a workpiece having a hollow, circular cross-sectional area.

In another example, FIG. 2B illustrates a workpiece 21 having a hollow, circular cross-sectional area and which is manufactured from a metal material, such as steel. As a horizontally-disposed bandsaw blade 18 advances through the workpiece 21 from an entry location 206 to a first location 208 disposed just prior to an opening 209 defined by the workpiece 21, the volume of workpiece material encountered by the bandsaw blade 18 increases. As such, the bandsaw blade 18 can experience both an increase in tooth load and a decrease in cutting rate. As the bandsaw blade 18 advances from the location 208 toward a midpoint location 210, the volume of workpiece material encountered by the bandsaw blade 18 decreases, the bandsaw blade 18 can experience both a decrease in tooth load and an increase in cutting rate. Further, as the volume of material relative to the bandsaw blade 18 increases between the midpoint location 210 and maximizes at a second location 212 and then decreases from the second location 212 to an exit location 214, the tooth load and cutting rate of the bandsaw blade 18 can vary.

As indicated in these examples, the machinability attribute of the workpieces 20, 21 relates to the relative ease or difficulty than can be experienced by a horizontally-disposed bandsaw blade 18 while advancing through a workpiece. Accordingly, with reference to FIG. 1, the blade angle controller 36 can be configured adjust the angle of the bandsaw blade 18 relative to a horizontal reference 120 to address the individual machinability attributes of each workpiece 20, 21 in order to increase the cutting performance of the blade 18.

Figure 3:
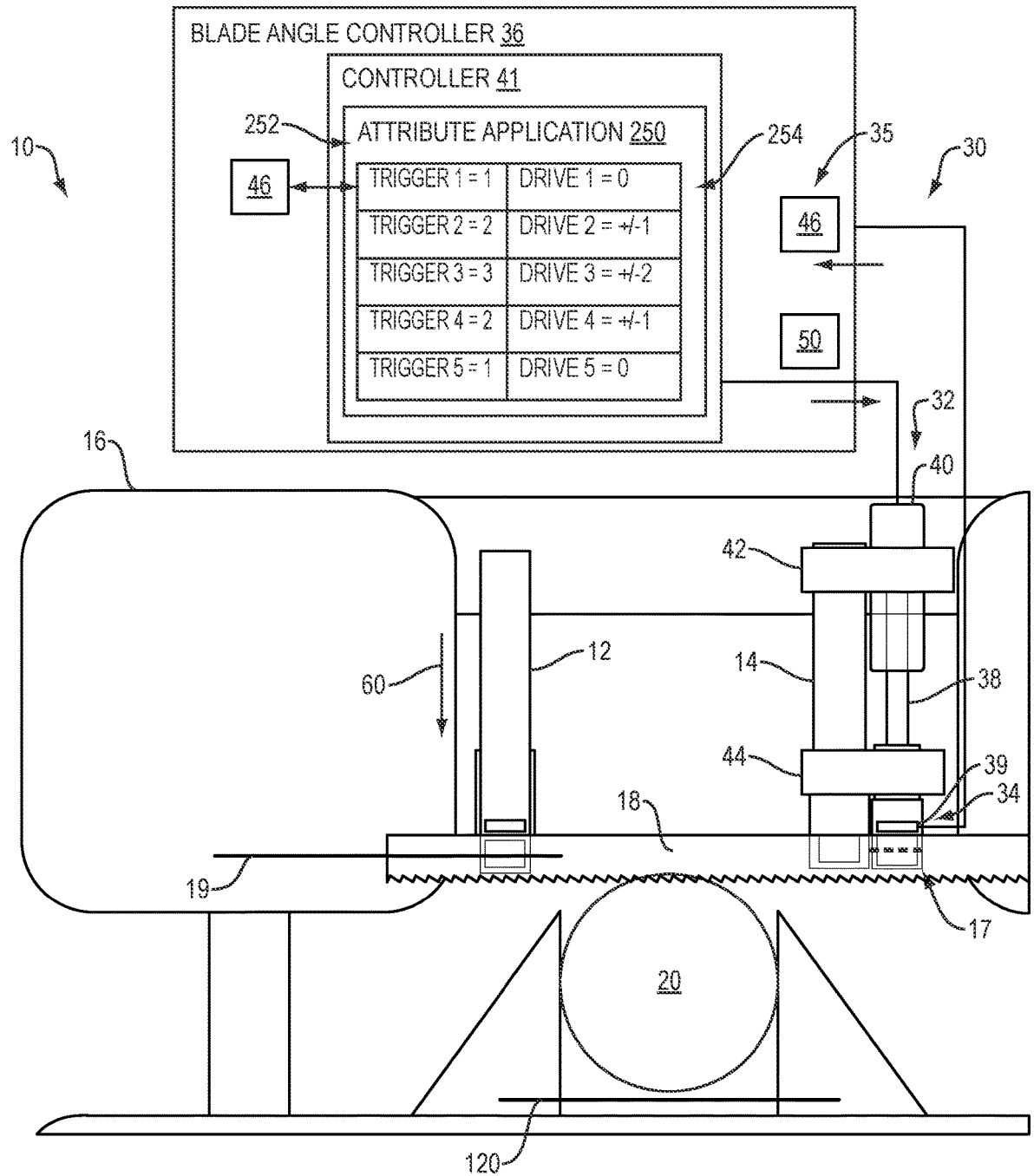
FIG. 3 illustrates a blade angle adjustment assembly disposed in a first position relative to a workpiece, according to one arrangement.
Figure 4:
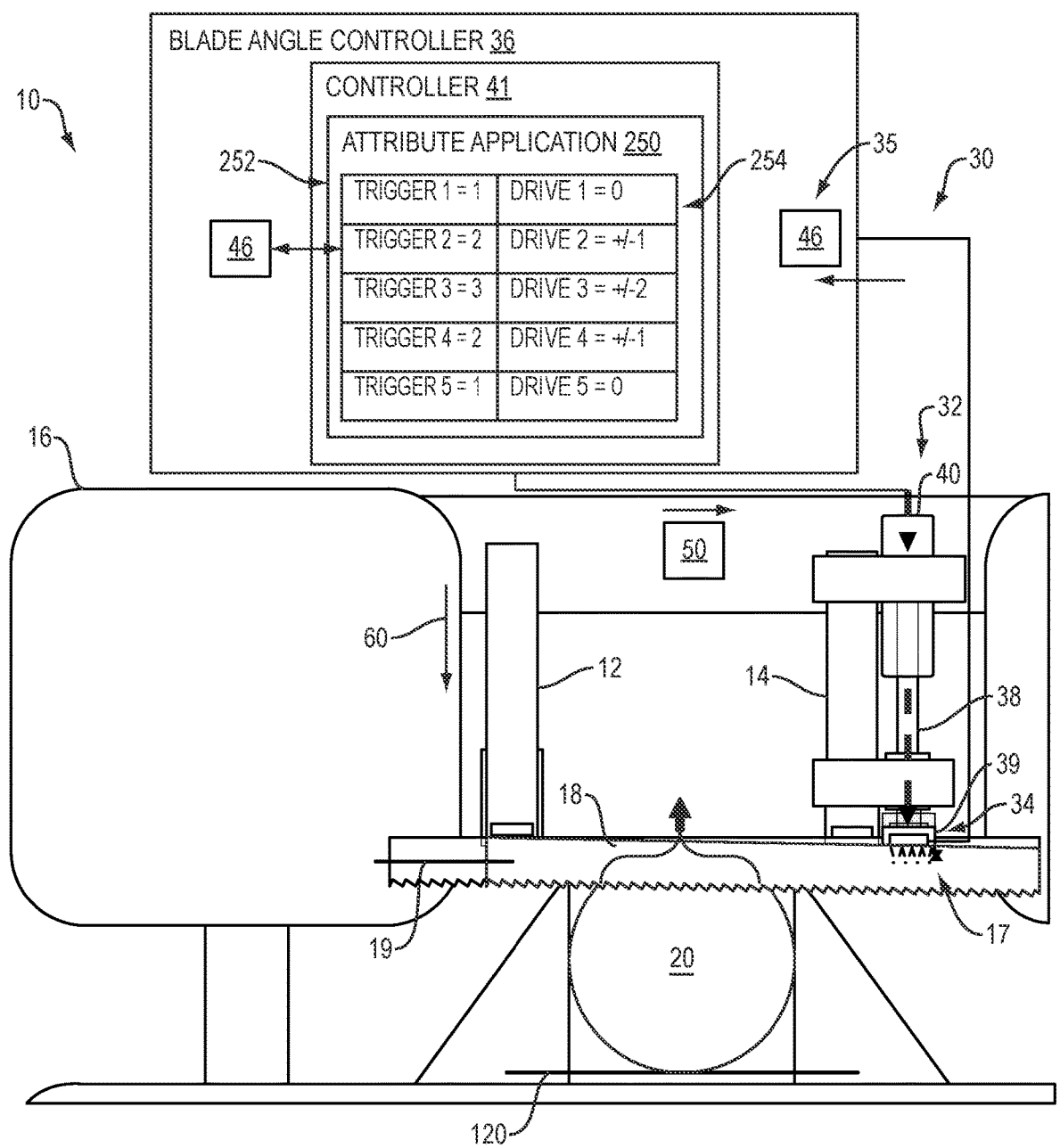
FIG. 4 illustrates the blade angle adjustment assembly of FIG. 3 disposed in a second position relative to a workpiece, according to one arrangement.

In one arrangement, as indicated in FIG. 3, the blade angle controller 36 can be configured with one or more sets of attribute applications 250 where each attribute application 250 can include a series of trigger values 252 and corresponding drive signal values 254 which correspond to the machinability attribute of a particular workpiece. A bandsaw machine operator can electronically access the blade angle controller 36 and can select a particular attribute application 250 corresponding to the machinability attribute of the workpiece 20.

For example, assume the case where the bandsaw machine 10 is set-up to cut the solid, cylindrical workpiece 20 illustrated in FIG. 2A. In such a case, the bandsaw machine operator can select the attribute application 250 identified as corresponding to the solid, circular workpiece 20. As illustrated in FIG. 3, the attribute application 250 indicates that as the trigger values 252 increase up to a median value, the corresponding drive signal values 254 increases up to that median value. Further, as the trigger values 252 decrease from the median value, the corresponding drive signal values 254 decrease, such as to zero, as well. Such a relationship between the trigger values 252 and drive signal values 254 corresponds to the machinability attributes of the workpiece 20.

During operation, as the bandsaw blade 18 engages a workpiece 20, the tooth load indicator 34 can generate the tooth load indication signal 35 and transmit the signal 46 to the blade angle controller 36. Based upon the tooth load indication signal 35, the blade angle controller 36 can provide a drive signal 50 to the blade angle adjustment mechanism 32 to adjust an angular positon of the bandsaw blade 18 within a cut plane of a workpiece.

For example, with reference to FIG. 3, in response to receiving the tooth load indication signal 35, the blade angle controller 36 can compare the tooth load indication signal value 35 to trigger values 252 provided by the attribute application 250. When the blade angle controller 36 detects that the tooth load indication signal value 35 meets a given trigger value 252, the controller 36 can provide the drive signal 50 having the corresponding drive signal value 254 to the blade angle adjustment mechanism 32 to rock or oscillate the angular positon of the bandsaw blade 18 within the cut plane of the workpiece 20. For example, when the tooth load indication signal 35 indicates that the bandsaw blade 18 is experiencing increased difficulty in cutting through the workpiece 20, the drive signal 50 can cause the blade angle adjustment mechanism 32 to dispose the bandsaw blade 18 at a varying angles (i.e., increasing and decreasing) relative to the workpiece 20. With such positioning, fewer teeth of the bandsaw blade 18 can engage the workpiece 20 during operation which enhances cutting performance and extends bandsaw blade 18 life.

The blade angle adjustment mechanism 32 and tooth load indicator 34 of the blade angle adjustment assembly 30 can be configured in a variety of ways.

For example, as shown in FIG. 3, the blade angle adjustment mechanism 32 can be configured as a hydraulic assembly that includes a housing 40 and a piston 38 having a first end moveably disposed within the housing 40 and a second end coupled to a blade guide element 15. The housing 40 is coupled to a first end of the second guide arm 14 of the frame 16 via coupler 42 while the second end of the piston 38 is slideably coupled to a second end of the second guide arm 14, such as via coupler 44.

The tooth load indicator 34 can be configured as a pressure sensor 39, such as a load cell, configured to generate, as the tooth load indication signal 35, a pressure signal 46 as the tooth load indication signal 35. In one arrangement, the pressure sensor 39 is disposed between the second end of the piston 38 and a blade guide element 17.

During operation, the change in the drive signal 50 provided to the blade angle adjustment mechanism 32 can drive the blade angle adjustment mechanism 32 to correspondingly change the angle of the bandsaw blade 18 relative to a horizontal reference 120. With reference to FIGS. 3-7, a description of an example of operation of the bandsaw machine 10 and blade angle adjustment assembly 30 is provided below.

Prior to a cutting operation, a bandsaw machine operator places a workpiece 20 within the bandsaw machine 10 and accesses the blade angle controller 36 to select a particular attribute application 250 corresponding to the machinability attributes of the workpiece 20. For example, as illustrated, the workpiece 20 is a solid, cylindrically shaped element. In such a case, the bandsaw machine operator can select the attribute application 250 identified as corresponding to a solid, cylindrical workpiece 20. With such selection, the blade angle controller 36 can generate and transmit preset drive signals 50 to blade angle adjustment mechanism 32 based upon expected tooth load sensing signals 35, such as pressure signals 46 to be received from a tooth load indicator 34, such as the pressure sensor 39.

At the beginning of a cutting operation, as the first and second guide arms 12, 14 advance the bandsaw blade 18 through the workpiece 20 along direction 60, the tooth load indicator 34 can detect the amount of tooth load experienced by the saw blade 18 and transmits the tooth load sensing signal 35 to the blade angle controller 36. For example, the pressure sensor 39 can initially sense that a relatively light cutting pressure is required at the top of the cut and can transmit a correspondingly proportional pressure signal 46 to the blade angle controller 36. The blade angle controller 36, in turn, compares the pressure signal 46 to the first trigger value, TRIGGER 1, provided by the attribute application 250. In this case, the blade angle controller 36 can detect the pressure signal 46 as being relatively smaller than the first trigger value and can either refrain from transmitting a drive signal 50 to the blade angle adjustment mechanism 32 or can transmit a zero value drive signal 50 to the blade angle adjustment mechanism 32. In such a case, a longitudinal axis 19 of the bandsaw blade 18 remains substantially parallel to a horizontal reference 120, such as shown in FIG. 3. As such, the bandsaw blade 18 beam strength remains stable relative to the first and second guide arms 12, 14 and the bandsaw machine 10 can achieves tooth penetration of the workpiece 20.

As the tooth load increases as the blade 18 progresses through the workpiece 20, the blade angle controller 36 can send updated drive signals 50 to the blade angle adjustment mechanism 32 to adjust the angular position of the bandsaw blade 18. For example, in FIG. 4, as the bandsaw machine 10 advances the bandsaw blade 18 along direction 60 into a wider cross-section of the workpiece 20, the pressure sensor 39 of the blade angle adjustment assembly 30 can detect an increase in cutting pressure utilized by the bandsaw machine 10 to allow the teeth to penetrate the workpiece 20. The pressure sensor 39 transmits corresponding pressure signals 46 to the blade angle controller 36 which are indicative of the detected increased cutting pressure. The blade angle controller 36, in turn, compares the pressure signals 46 to a second trigger value, TRIGGER 2, provided by the attribute application 250.

In response to detecting the pressure signal 46 as meeting the second trigger value, the blade angle controller 36 can initiate rocking of the bandsaw blade 18 by transmitting a drive signal 50 to the blade angle adjustment mechanism 32. The strength of the drive signal 50 can correspond to the drive signal value 254 associated with the second trigger value, TRIGGER 2. For example, the drive signal 50 can cause the piston 38 to extend from, and retract within, the housing 40 at a depth and rate that is proportional to the drive signal 50, such as a depth of +/−1 units relative to the horizontal reference 120. Such motion of the piston 38 lowers and raises the blade guide element 17 to create an up-and-down rocking motion of the bandsaw blade 18 relative to the first guide arm 12. This rocking or pivoting motion reduces the number of teeth engaged with the workpieces 20, increases tooth penetration, and allows the feed rate of the bandsaw blade 18 to be maintained by the bandsaw machine 10 while mitigating crooked cutting or stripping of the bandsaw teeth.

As the bandsaw machine 10 advances the saw blade 18 along direction 60 into the widest cross-section of the workpiece 20 (e.g., the center of the workpiece), the tooth load indicator 34 of the blade angle adjustment assembly 30 can detect an increase in the tooth load experienced by the bandsaw machine 10 to maintain the cutting rate of the bandsaw blade 18 and to allow the teeth to penetrate the workpiece 20. For example, as the pressure sensor 39 detects an increase in pressure utilized by the bandsaw machine 10 to maintain the cutting rate, the pressure sensor 39 can transmit pressure signals 46 to the blade angle controller 36 having correspondingly increasing pressure signal values. In response to receiving the updated pressure signals 46, blade angle controller 36 can compare the pressure signals 46 to the second trigger value, TRIGGER 2, and to the third trigger value, TRIGGER 3, as provided by the attribute application 250.

Figure 5:
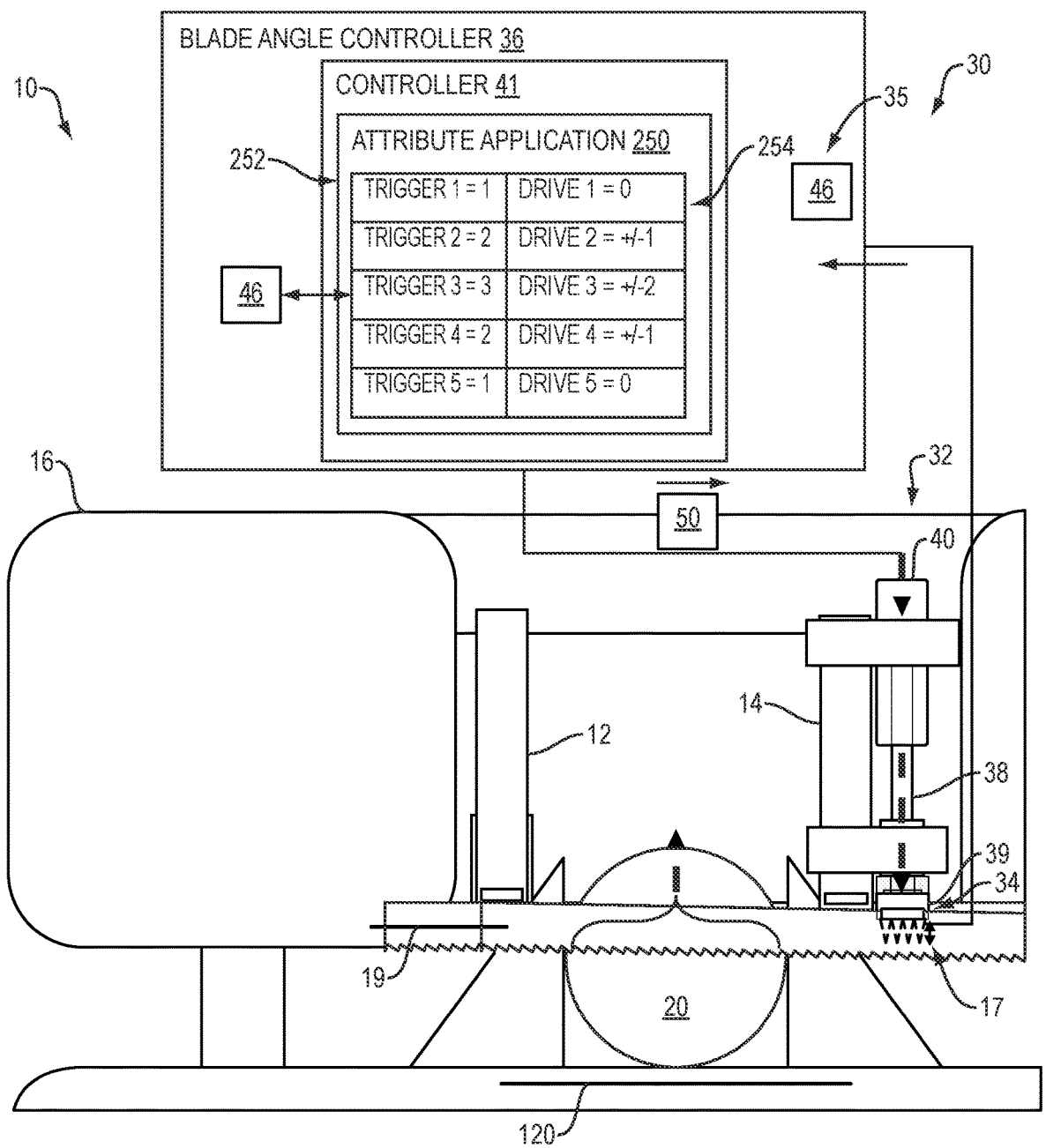
FIG. 5 illustrates the blade angle adjustment assembly of FIG. 3 disposed in a third position relative to a workpiece, according to one arrangement.

In response to detecting the pressure signals 46 as exceeding the second trigger value and as approaching the third trigger value, the blade angle controller 36 transmits corresponding drive signals 50 to the blade angle adjustment mechanism 32 which corresponds to increasing drive signal values 254 between the second and third trigger value 252. For example, as the blade angle controller 36 detects the pressure signals 46 increasing between the second trigger value third trigger value, the blade angle controller 36 can transmit increasingly valued drive signals 50 to the blade angle adjustment mechanism 32 to increase the up and down displacement of the piston 38. In the present example, the drive signals 50 can increase the extension and retraction of the piston 38 relative to the housing 40 from a depth of +/−1 unit up to a depth of +/−2 units to increase the rocking motion of the bandsaw blade 19 relative to the horizontal reference 120. At this maximum extension and retraction, the bandsaw blade 18 engages the widest cross-section of the workpiece 20 as shown in FIG. 5. Such an increase in extension/retraction of the piston 38 can provide further shortening the cut plane, which in turn engages fewer teeth of the bandsaw blade 18 in a more radical angle, thereby allowing the teeth to continue penetration of the workpiece 20 at a constant rate.

Figure 6:
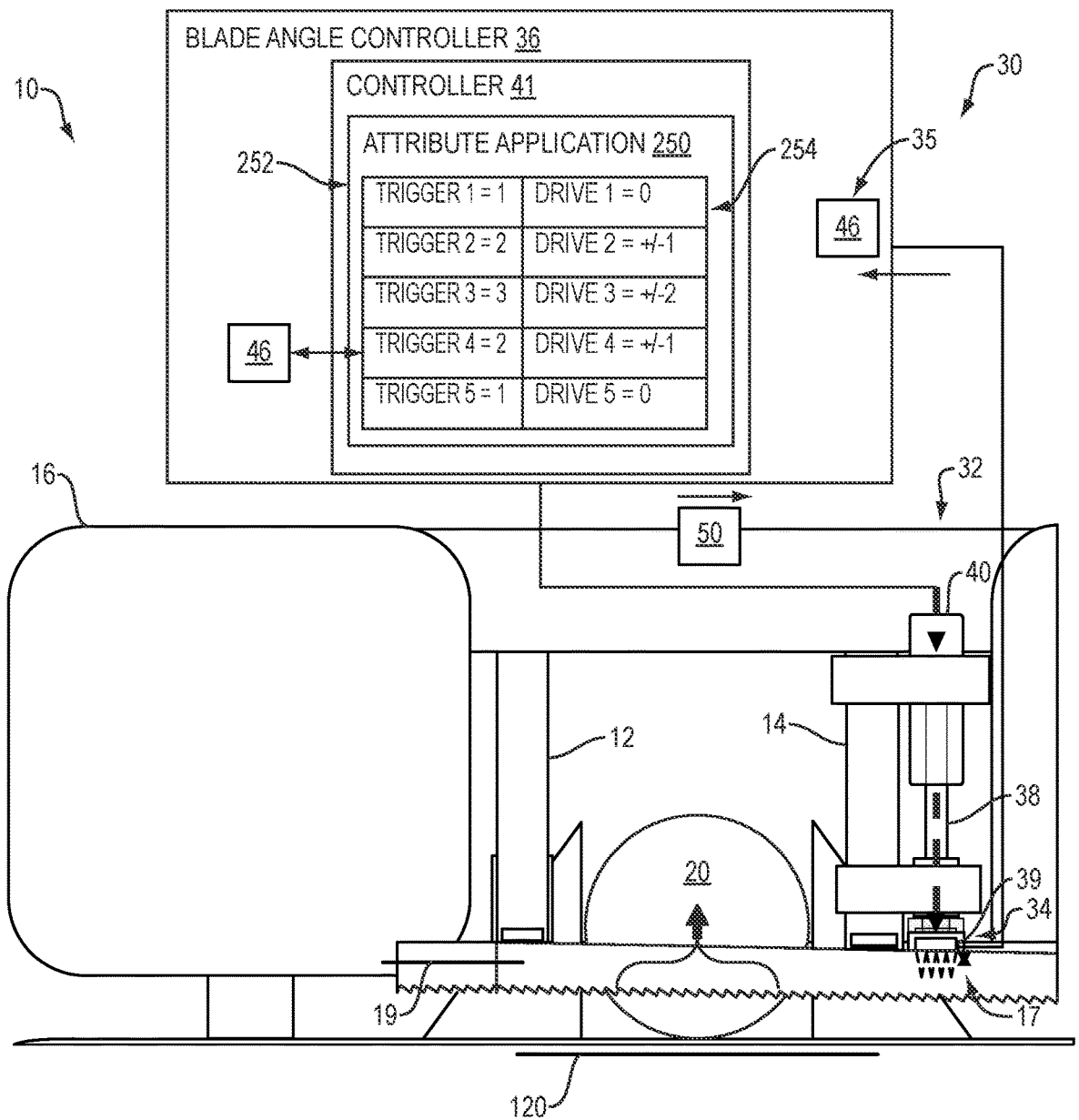
FIG. 6 illustrates the blade angle adjustment assembly of FIG. 3 disposed in a fourth position relative to a workpiece, according to one arrangement.

In FIG. 6, as the bandsaw blade 18 passes the center point of the workpiece 20, the tooth load indicator 34 can detect a decrease in the tooth load experienced by the bandsaw machine 10 to maintain the cutting rate of the bandsaw blade 18 and to allow the teeth to penetrate the workpiece 20. For example, as the pressure sensor 39 detects a decrease in pressure utilized by the bandsaw machine 10 to maintain the cutting rate, the pressure sensor 39 can provide pressure signals 46 to the blade angle controller 36 indicating a reduction in the cutting pressure utilized by the bandsaw machine 10 to penetrate the workpiece 20. In response to receiving the updated pressure signals 46, the blade angle controller 36 can compare the pressure signals 46 to the third trigger value, TRIGGER 3, and to the fourth trigger value, TRIGGER 4, as provided by the attribute application 250.

In response to detecting the pressure signals 46 as falling below the third trigger value and as decreasing towards the fourth trigger value, the blade angle controller 36 can transmit corresponding drive signals 50 to the blade angle adjustment mechanism 32 which corresponds to a decreasing drive signal value 254 between the third and fourth trigger values. For example, as the blade angle controller 36 detects the pressure signals 46 as decreasing between the third trigger value and the fourth trigger value, the blade angle controller 36 provides corresponding drive signals 50 to the blade angle adjustment mechanism 32 to reduce the magnitude and stroke length of the piston 38. In the present example, the drive signals 50 can decrease the extension and retraction of the piston 38 relative to the housing 40 from a depth of +/−2 units relative to the horizontal reference 120 to a depth of +/−1 unit to reduce the up-and-down rocking motion of the bandsaw blade 19 relative to the horizontal reference 120. Such a decrease in extension/retraction of the piston 38 can provide further shortening the cut plane, which in turn engages an increased number of teeth of the bandsaw blade 18 to allow the teeth to continue penetration of the workpiece 20 at a constant rate.

Figure 7:
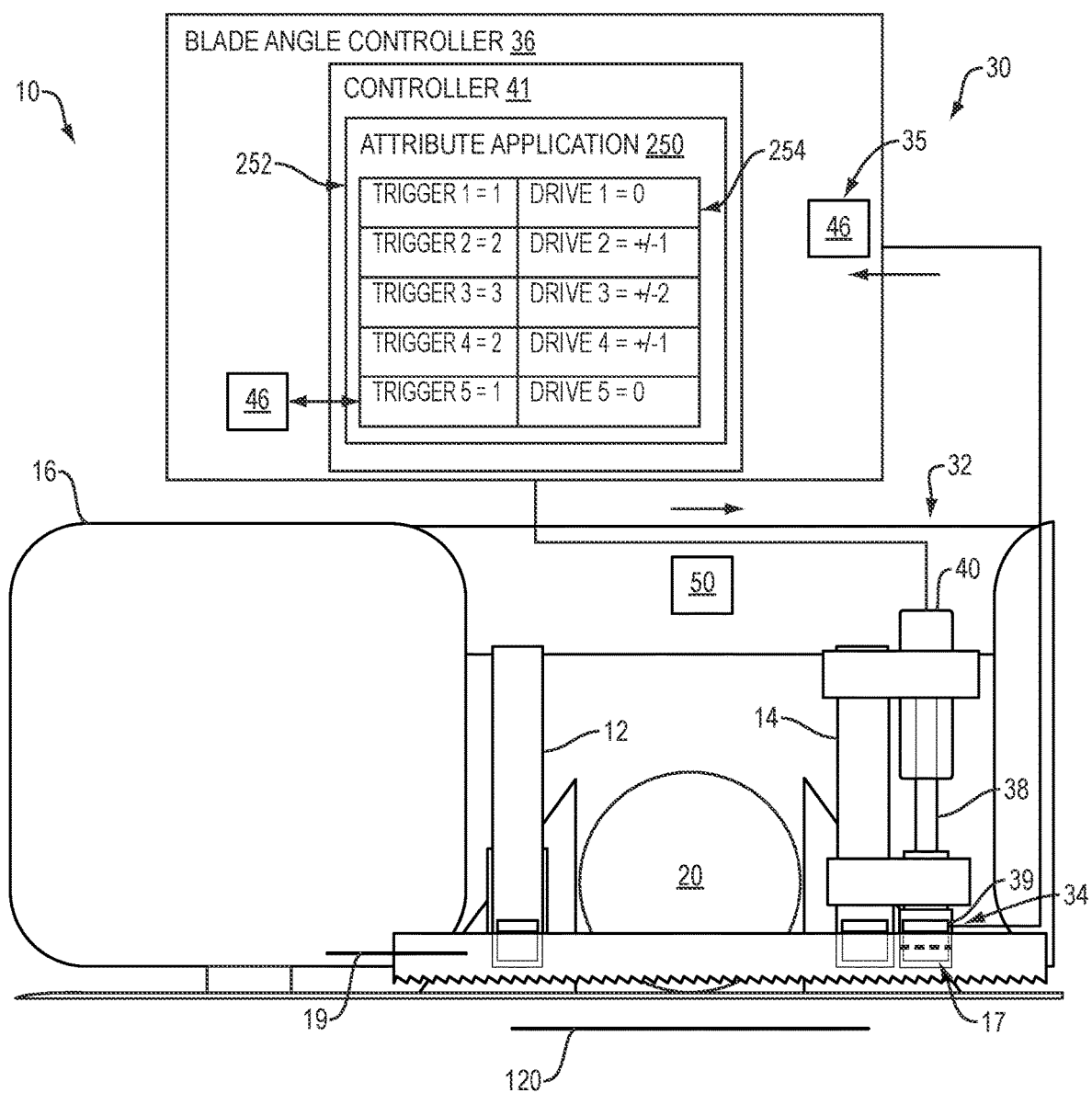
FIG. 7 illustrates the blade angle adjustment assembly of FIG. 3 disposed in a fifth position relative to a workpiece, according to one arrangement.

In FIG. 7, as the bandsaw blade 18 nears the exit point, the tooth load indicator 34 can detect the tooth load experienced by the bandsaw machine 10 to maintain the cutting rate of the bandsaw blade 18, and to allow the teeth to penetrate the workpiece 20, as nearing zero. For example, the pressure sensor 39 can provide the near-zero value pressure signals 46 to the blade angle controller 36. In response to receiving the updated pressure signals 46, the blade angle controller 36 can compare the pressure signals 46 to the fifth trigger value, TRIGGER 5, as provided by the attribute application 250.

In response to detecting the pressure signals 46 as reaching the fifth trigger value and as decreasing from the fourth trigger value, the blade angle controller 36 can transmit corresponding drive signals 50 to the blade angle adjustment mechanism 32 which scales the up-and-down displacement of the piston 38 back to zero, thereby allowing the bandsaw blade 18 to exit the workpiece 20 while mitigating motion which could lead to tooth stripping.

As provided above, the blade angle adjustment assembly 30 can progressively vary the cutting path of the bandsaw blade 18 by initiating, increasing, decreasing, and/or ceasing wave activation and magnitude, based upon the tooth load sensing signal 35 (e.g., pressure signal 46) generated by the tooth load indicator 34 (e.g., pressure sensor 39). For example, at the point where relatively low tooth load (e.g., light cutting pressure) is detected, based upon the machinability attribute of the workpiece, the blade angle adjustment assembly 30 can maintain the bandsaw blade 18 in a single plane (i.e., no rocking) to mitigate damage to the saw blade teeth. As an increase in tooth load (e.g., cutting pressure) is detected, the blade angle adjustment assembly 30 can instigate a rocking motion in the bandsaw blade 18 which can increase in magnitude and stroke length up to the widest cross section of the workpiece 20. This provides shortening the cut plane, which in turn engages fewer teeth of the bandsaw blade 18 in a more radical angle, thereby allowing the teeth to continue penetration of the workpiece 20 at a constant rate. As the bandsaw blade 18 passes the thickest or most difficult section, the rocking motion gradually decreases which provides a relatively gentle exit for the bandsaw blade 18 from the workpiece 20. Further, the blade angle adjustment assembly 30 spreads cutting action over the entire length of the blade 18 which allows the bandsaw blade teeth to wear in a substantially uniform manner, as compared to conventional tapered-back bandsaw blades.

Figure 8:
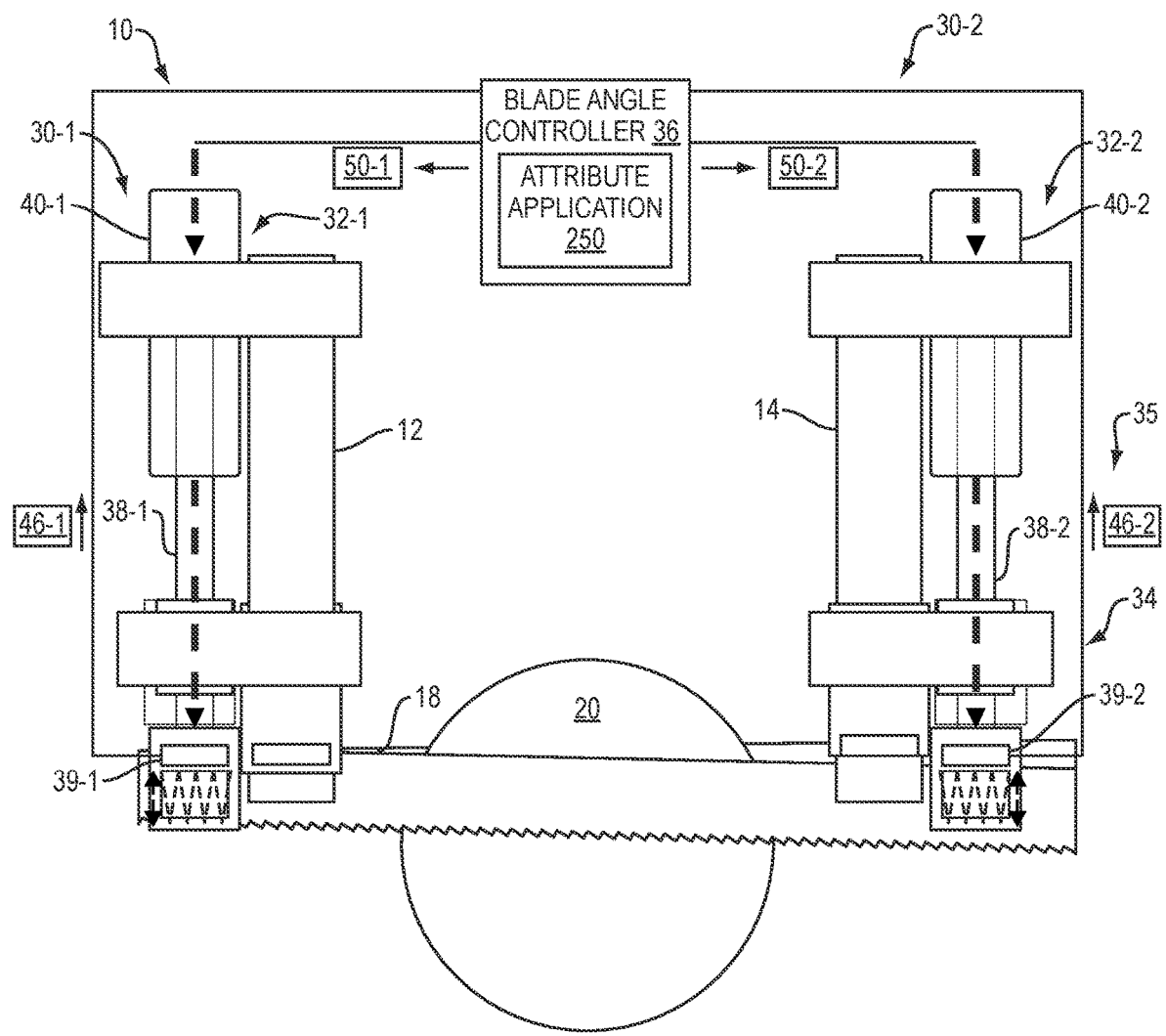
FIG. 8 illustrates a bandsaw machine having first and second blade angle adjustment assemblies, according to one arrangement.

As described above, a bandsaw machine 10 can utilize a single blade angle adjustment assembly 30 to pivot a bandsaw blade 18 relative to a first guide arm 12. Such description is by way of example only. In one arrangement, as indicated in FIG. 8, a bandsaw machine 10 can utilize two or more blade angle adjustment assemblies 30 to adjust the angle of the bandsaw blade 18 relative to a workpiece 20.

For example, as illustrated, the first guide arm 12 includes a first blade angle adjustment assembly 30-1 and the second guide arm 14 includes a second blade angle adjustment assembly 30-2. As illustrated, the first blade angle adjustment assembly 30-1 can include a first blade angle adjustment mechanism 32-1 and a first pressure sensor 39-1 coupled to the first blade angle adjustment mechanism 32-1. Further, the second blade angle adjustment assembly 30-2 can include a second blade angle adjustment mechanism 32-2 and a second pressure sensor 39-2 coupled to the second blade angle adjustment mechanism 32-2. The blade angle controller 36 is disposed in electrical communication with the first blade angle adjustment mechanism 32-1, the first pressure sensor 39-1, the second blade angle adjustment mechanism 32-2, and the pressure sensor 39-2.

During operation, as the first and second guide arms 12, 14 advance the bandsaw blade 18 through a workpiece 20, the blade angle controller 36 can receive a first pressure signal 46-1 from the first pressure sensor 39-1 and a second pressure signal 46-2 from the second pressure sensor 39-2. The blade angle controller 36 can compare the pressure signals 46-1, 46-2 to trigger values provide by the attribute application 250. As the pressure signals 46-1, 46-2 approach or meet particular trigger values, the blade angle controller 36 can provide drive signals 50-1, 50-2 to the first and second blade angle adjustment mechanisms 32-1, 32-2 to initiate, increase, decrease, and cease rocking of the bandsaw blade 18, such as described above.

For example, based upon a comparison of the first pressure signal 46-1 and the second pressure signal 46-2 with a trigger value provide by the attribute application 250, the blade angle controller 36 can provide a first drive signal 50-1 to the first blade angle adjustment mechanism 32-1 and a second drive signal 50-1 to the second blade adjustment mechanism 32-2. For example, the first drive signal 50-1 can cause the first piston 38-1 to retract within the housing 40-1 to adjust an angular positon of a bandsaw blade 18 within a cut plane of the workpiece 20 to an upward position. Further, the second drive signal 50-2 can cause the second piston 38-2 to extend from the housing 40-2 to adjust an angular positon of a bandsaw blade 18 within a cut plane of the workpiece 20 to a downward position. Such positioning adjusts the magnitude and stroke length of the bandsaw blade 18 relative to the workpiece 20. As the first and second guide arms 12, 14 further advance the bandsaw blade 18 through a workpiece 20, the blade angle controller 36 can receive updated pressure signals 46-1, 46-2 from the sensors 39-1, 39-2 and can adjust the drive signals 50-1, 50-1 to further adjust the angular position of the bandsaw blade 18. For example, the blade angle controller 36 can provide updated first drive signals 50-1 can cause the first piston 38-1 to extend from the housing 40-1 to adjust an angular positon of a bandsaw blade 18 within a cut plane of the workpiece 20 toward a downward position and updated second drive signals 50-2 can cause the second piston 38-1 to retract into the housing 40-2 to adjust an angular positon of a bandsaw blade 18 within a cut plane of the workpiece 20 toward an upward position.

By utilizing two or more blade angle adjustment assemblies 30 to adjust the angle of the bandsaw blade 18, a bandsaw machine 10 can magnify the effect of rocking the bandsaw blade 18 on cutting the workpiece 20. For example, the use of first and second blade angle adjustment assemblies 30-1, 30-2 can double the stroking action of the bandsaw blade 18 relative to the workpiece 20, thereby increasing the rate of cut while allowing the bandsaw blade teeth to wear in a substantially uniform manner.

As provided above, the blade angle adjustment mechanism 32 can be configured as a hydraulic assembly that includes a housing 40 is coupled to a first end of the second guide arm 14 and a piston 38 having a first end moveably coupled to the housing 40 and a second end slideably coupled to a second end of the guide arm 14. Further, the piston 38 can includes a blade guide element 17 disposed at the second end for contacting a bandsaw blade 18. The blade angle adjustment mechanism 32, however, can be configured in a variety of ways to create the sinusoidal motion of the bandsaw blade 18.

Figure 9A:
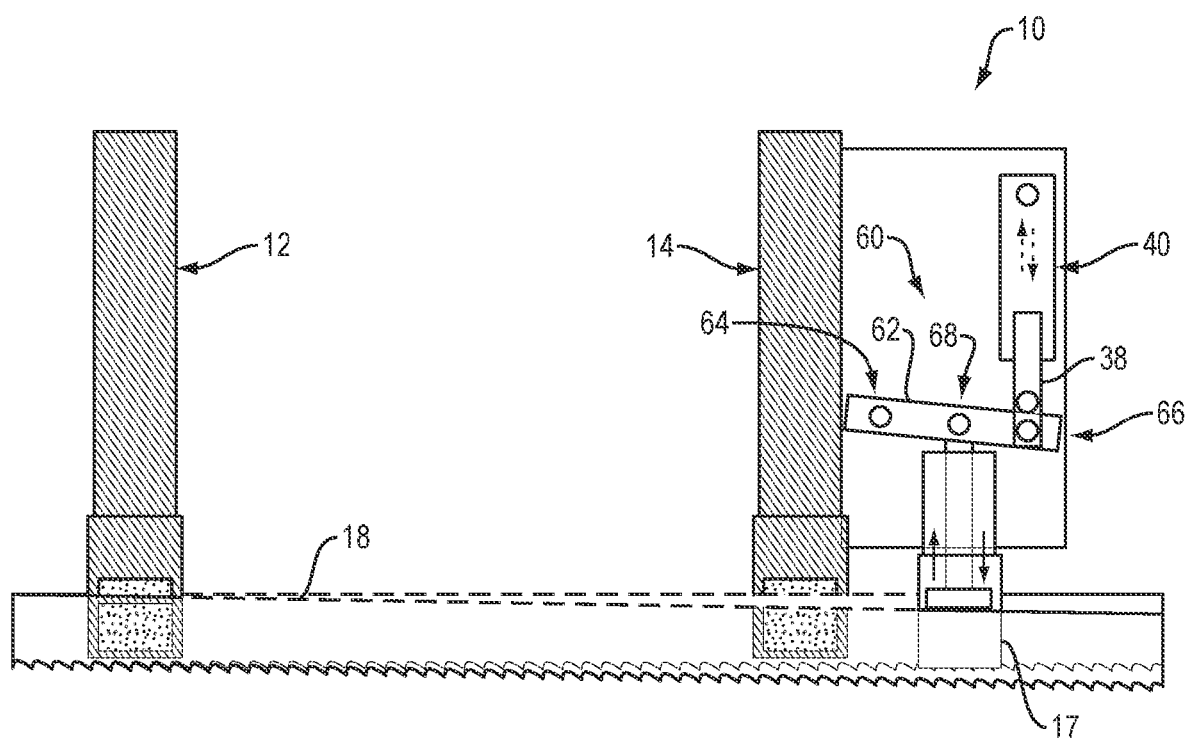
FIG. 9A illustrates a blade angle adjustment assembly having a horizontal levered piston, according to one arrangement.
Figure 9B:
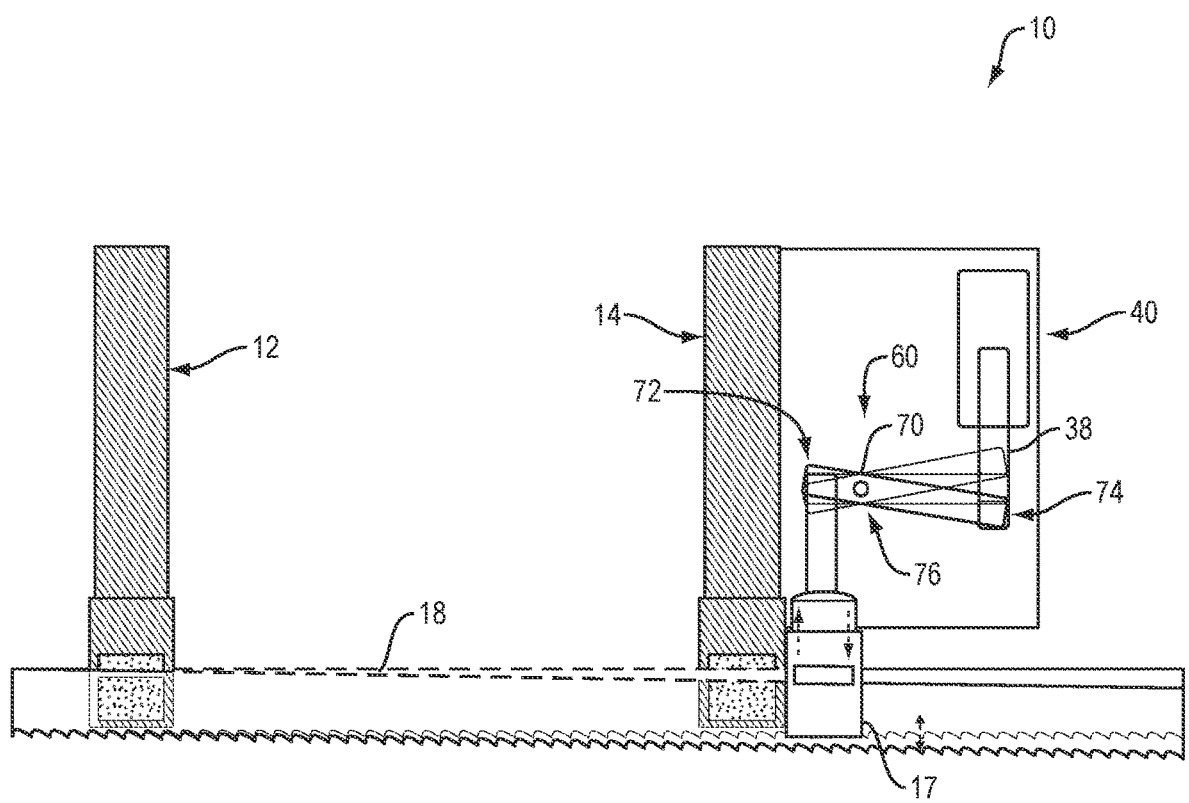
FIG. 9B illustrates a blade angle adjustment assembly having a horizontal levered piston, according to one arrangement
Figure 9C:
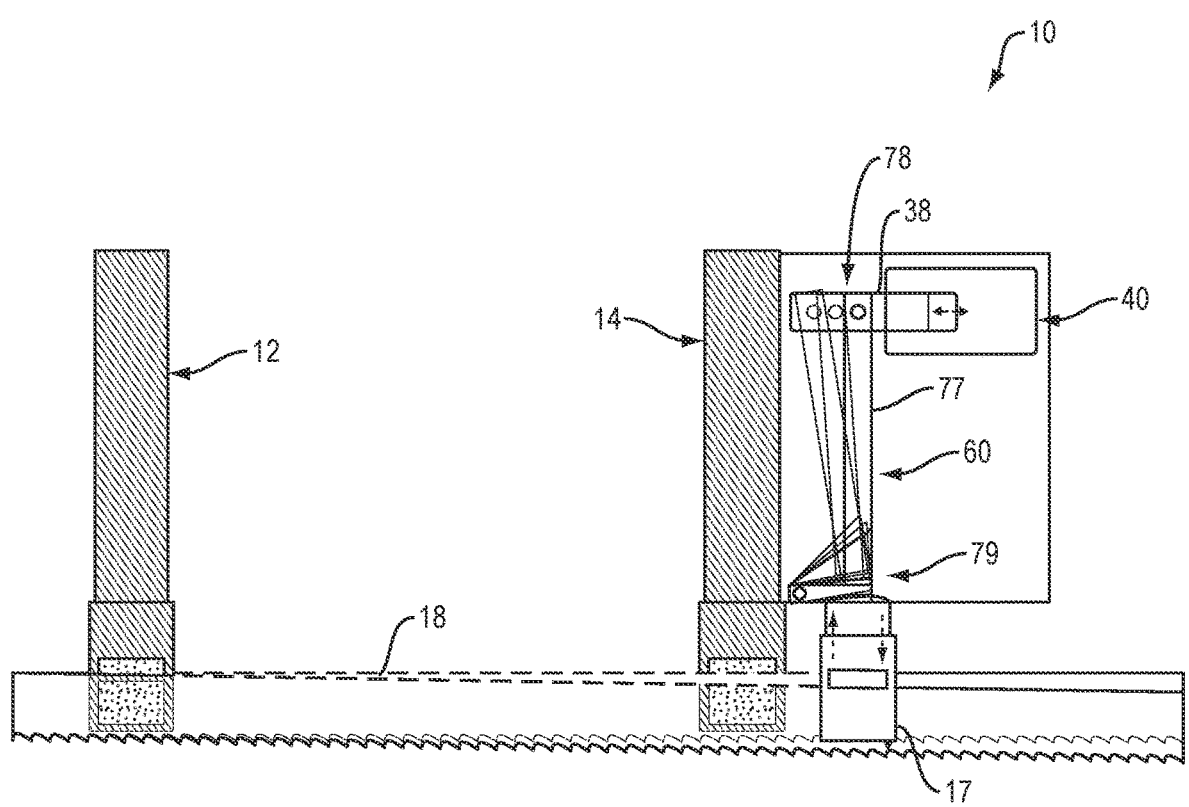
FIG. 9C illustrates a blade angle adjustment assembly having a vertical levered piston, according to one arrangement

In one arrangement, as shown in FIG. 9, the blade angle adjustment mechanism 32 can be configured as a hydraulic assembly that includes a lever assembly 60 disposed between a second end of the piston 38 and the blade guide element 17. For example, FIG. 9A illustrates the lever assembly 60 as including a horizontally disposed lever element 62 having a first end 64 rotatably coupled to the second guide arm 14, a second end 66 rotatably coupled to the piston 38, and a central portion 68 coupled to the blade guide element 17. The positioning of the lever element 62 can increase the output load generated by the piston 38 on the blade guide by a ratio of 2:1. In another example, FIG. 9B illustrates the lever assembly 60 as including a horizontally disposed lever element 70 having a first end 72 rotatably coupled to the blade guide element 17, a second end 74 rotatably coupled to the piston 38, and a central portion 76 coupled to the second guide arm 14. In another example, FIG. 9C illustrates a horizontally disposed blade angle adjustment mechanism 32 having a lever assembly 60 that includes a vertically disposed lever element 70 having a first end 78 rotatably coupled to the piston 38 and a second end 79 coupled to the blade guide element 17.

The lever assembly 60 is configured to increase the amount of force generated by the piston 38 on the blade guide element 17 and bandsaw blade 18. With such a configuration, the blade angle adjustment mechanism 32 can utilize the increased leverage to create the pivoting action of the bandsaw blade 18.

As described above, the blade angle adjustment mechanism 32 is configured as a hydraulic assembly. Such description is by way of example only. In one arrangement, the blade angle adjustment mechanism 32 can be configured as a motorized mechanism having a motor 80 and a drive wheel 82. The motor 80, such as an electric motor drive, can either continuously rotate or can provide an alternating forward and reverse direction on the drive wheel 82 to control the magnitude of the displacement of a drive arm 81 and the rocking or oscillation of a bandsaw blade 18.

Figure 10:
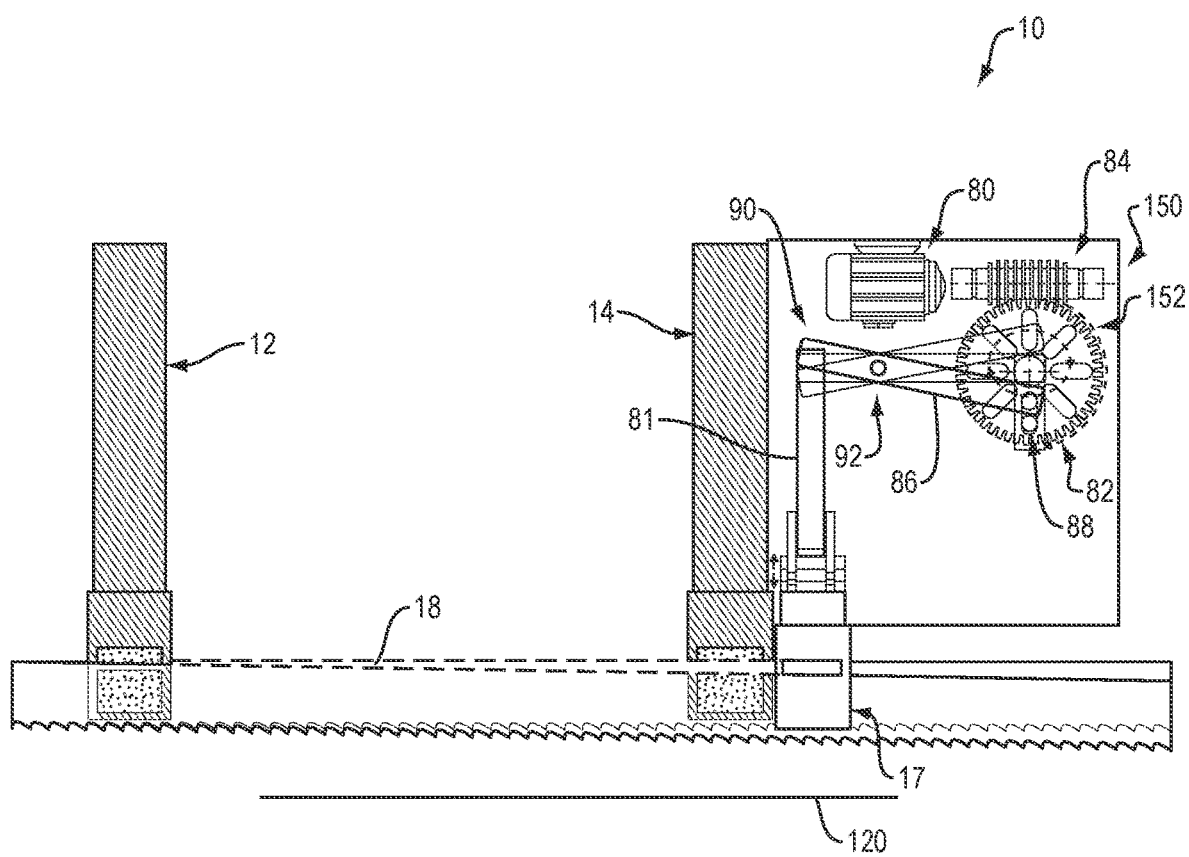
FIG. 10 illustrates a blade angle adjustment assembly having a rotating asymmetric drive mechanism, according to one arrangement.

For example, FIG. 10 illustrates the blade angle adjustment mechanism 32 is configured as a rotating asymmetric drive mechanism 150 which includes the motor 80 operationally coupled to the drive wheel 82. As illustrated, the drive wheel 82 can be configured as a gear 152 which engages the motor 80 via a worm screw 84. The rotating asymmetric drive mechanism 150 further includes an arm 86 having a first end 88 rotatably coupled to the gear 152 at a location that is offset a distance from an axis of rotation of the drive wheel. The arm 86 also has a second end 90 coupled to the blade guide element 17 and a central portion 92 rotatably coupled the second guide arm 14. During operation, the blade angle controller 36 provides the drive signal 50 to the motor 80. As the motor 80 rotates the worm screw 84 in response to the drive signal 50, the worm screw 84, in turn, causes the gear 152 to rotate about an axis of rotation. Rotation of the gear 152 causes the arm 86 to pivot relative to the central portion to extend or retract the drive arm 81 and corresponding blade guide element 17 relative to a horizontal reference 120.

Figure 11A:
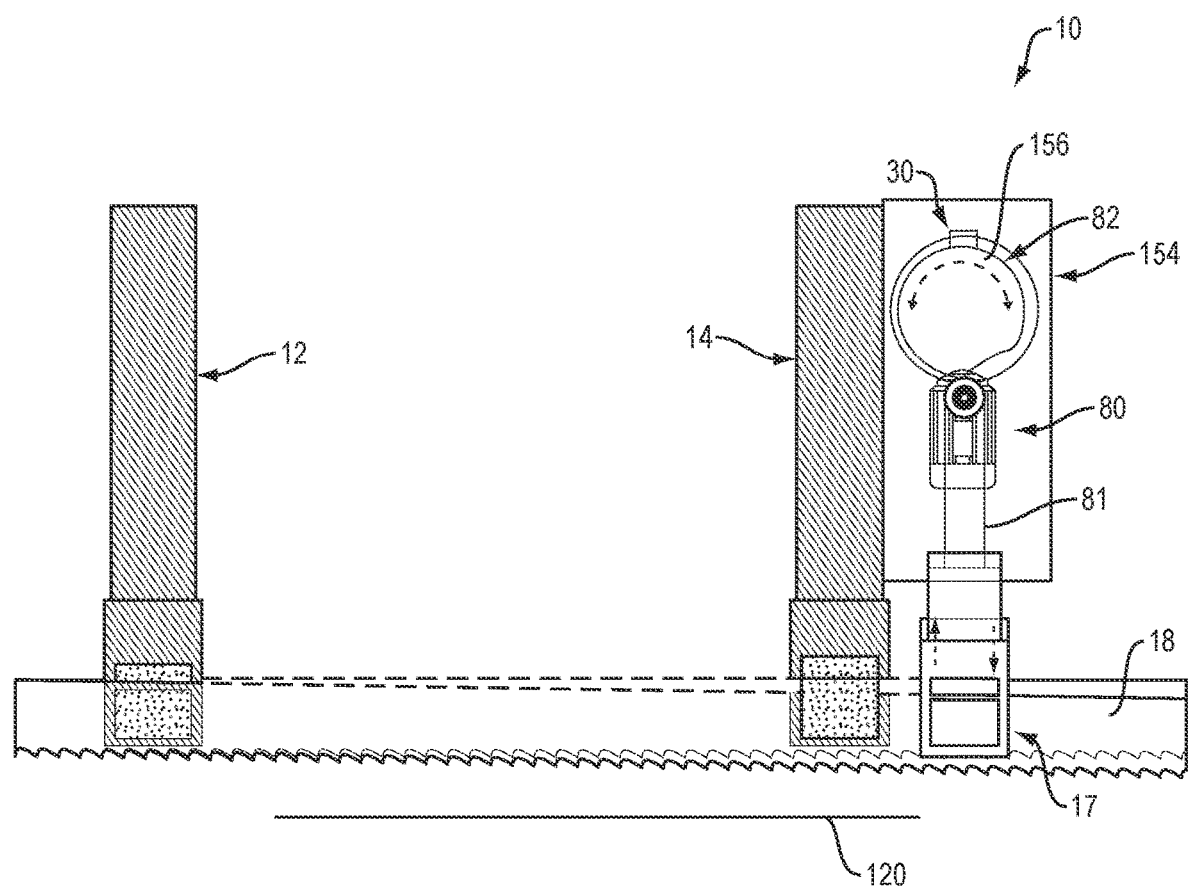
FIG. 11A illustrates a blade angle adjustment assembly having a linear electric motor drive, according to one arrangement.
Figure 11B:
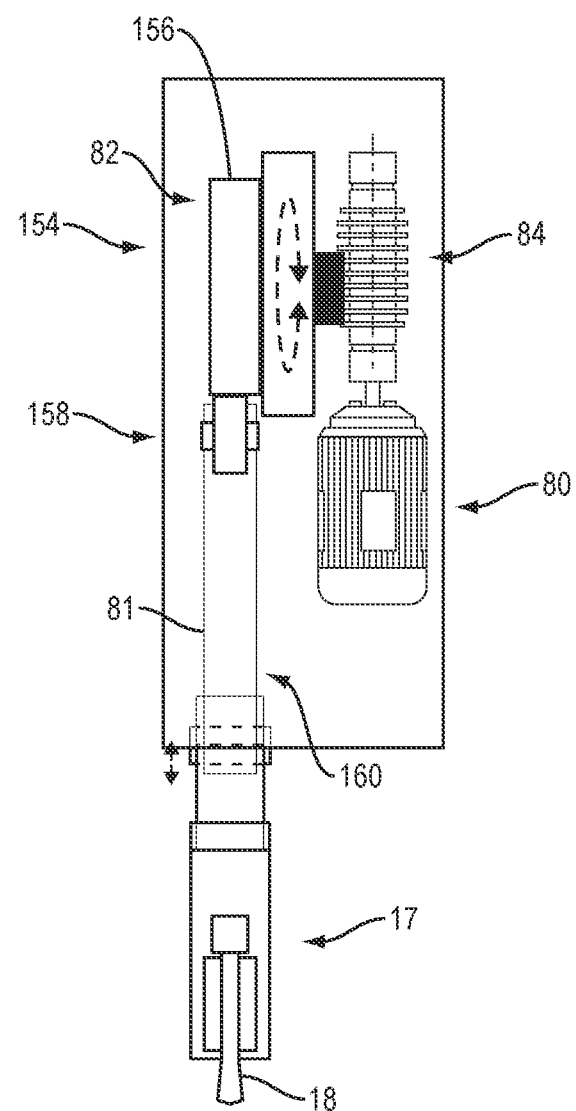
FIG. 11B illustrates a blade angle adjustment assembly having a linear electric motor drive, according to one arrangement.

In another example, FIGS. 11A and 11B illustrate the blade angle adjustment mechanism 32 is configured as a rotating cam drive mechanism 154 which includes the motor 80 operationally coupled to the drive wheel 82. As illustrated, the drive wheel 82 can be configured as a cam 156 which engages the motor 80 via a worm screw 84. The rotating cam drive mechanism 154 further includes an arm 156 having a first end 158 disposed in operational communication with the cam 156. The arm 81 also has a second end 90 coupled to the blade guide element 17. During operation, the blade angle controller 36 provides the drive signal 50 to the motor 80. As the motor 80 rotates the worm screw 84 in response to the drive signal 50, the worm screw 84, in turn, causes the cam 156 to rotate about an axis of rotation. Rotation of the cam 156 causes extension and/or retraction of the arm 81 and the corresponding blade guide element 17 relative to a horizontal reference 120.

In another example, the blade angle adjustment mechanism 52 can be configured as a linear actuator (not shown). For example, the linear actuator can be disposed in electrical communication with a blade angle controller 36 configured to receive drive signals 50 from the controller 36. In response to the drive signals 50, the linear actuator can extend or retract an associated arm relative to a horizontal axis 120 to adjust the angular orientation of the bandsaw blade 18 relative to a workpiece 20.

Figure 12:
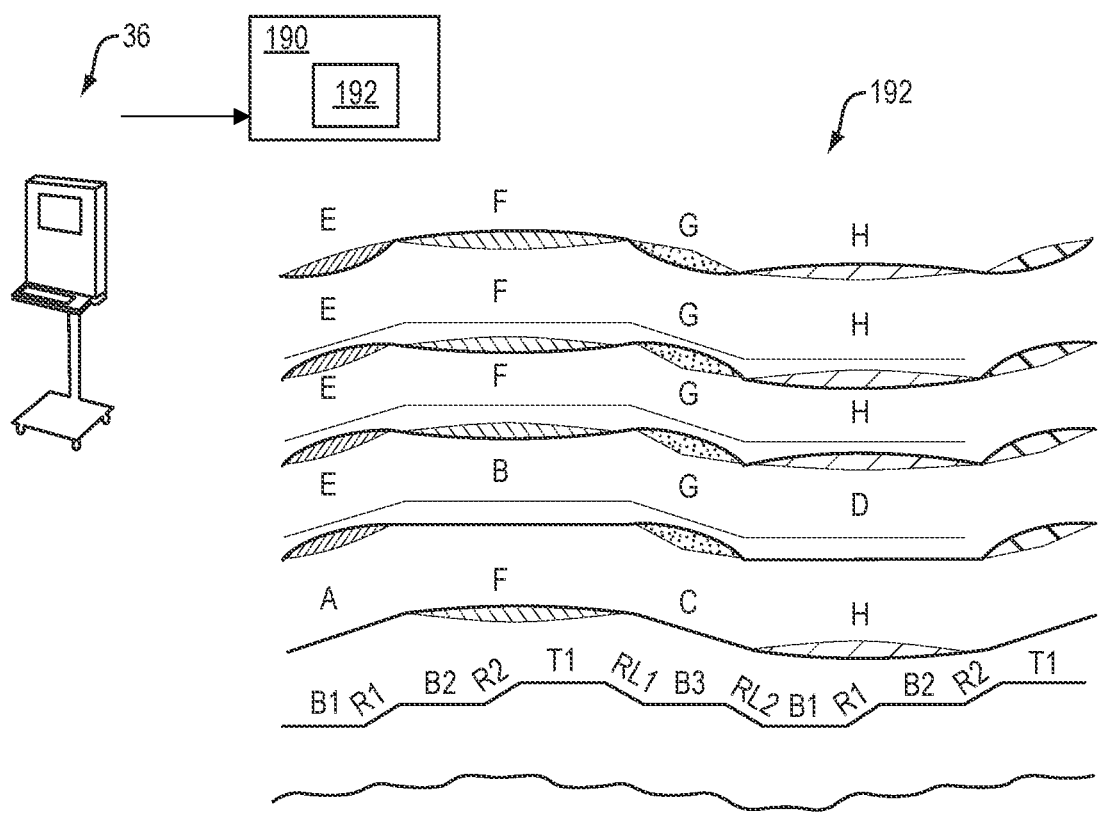
FIG. 12 illustrates a variety of drive signal patterns provided by a blade angle controller of the blade angle adjustment assembly, according to one arrangement.

As indicated above, the blade angle controller 36 can generate a drive signal 50 to oscillate the bandsaw blade 18 in a substantially sinusoidal manner. Such indication is by way of example only. In one arrangement, as indicated in FIG. 12, the blade angle controller 36 can be configured to generate a drive signal 190 that causes the blade angle adjustment mechanism 32 to replicate the tapering action generated by the back edge of tapered bandsaw blades. For example, the drive signal 190 can cause the piston 38 to actuate the bandsaw blade 18 to define a convex, concave, linear, and/or stepped motion 192 relative to a workpiece 20.

As described above, the blade angle adjustment assembly 30 can include a blade angle adjustment mechanism 32 and a tooth load indicator 34, such as a pressure sensor 39, each disposed in electrical communication with a blade angle controller 36. Such description is by way of example only. In one arrangement, the tooth load indicator 34 can be configured in a variety of ways.

Figure 13:
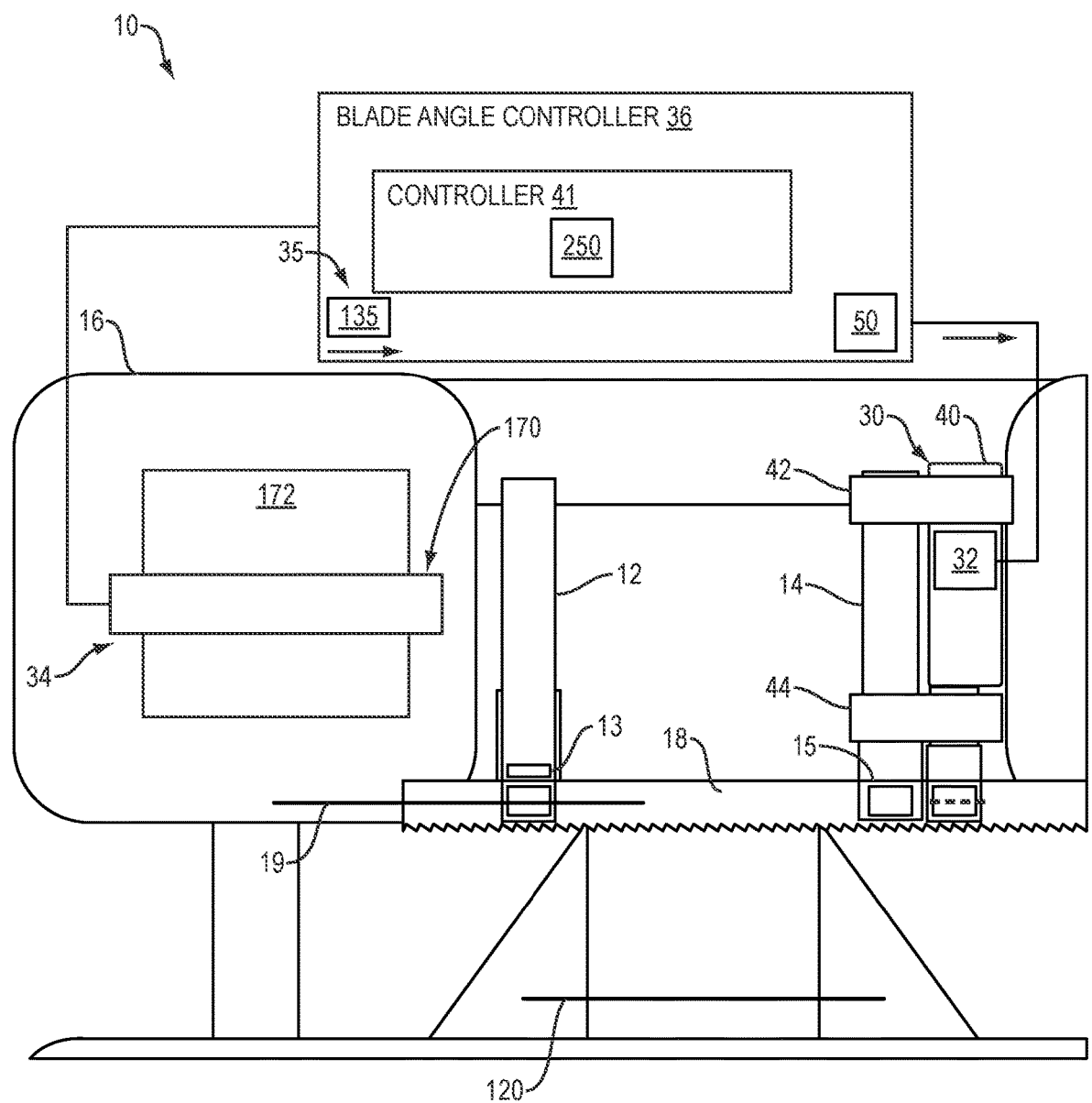
FIG. 13 illustrates a bandsaw machine having a bandsaw motor drag detector, according to one arrangement.

In one arrangement, with reference to FIG. 13, the tooth load indicator 34 can be configured as a bandsaw motor drag detector 170. In certain cases, such as for workpieces composed of metal alloy materials, the cross-section of the workpiece increases, a relatively larger bandsaw machine motor torque is utilized to cut through the workpiece. Accordingly, bandsaw machine motor drag is indicative of the relative ease or difficulty experienced by a bandsaw blade 18 when cutting through a workpiece 20. As such, the bandsaw motor drag detector 170 is configured as a non-invasive, electromagnetic collar which can be disposed about a portion of a bandsaw motor 172, such as the power conductors extending from the motor 172.

During operation, as the bandsaw motor 172 drives the bandsaw blade 18 relative to the workpiece 20, the bandsaw motor drag detector 170 can detect the motor torque of the bandsaw motor 172 and can generate, as the tooth load indication signal 35, a motor drag signal 135 which is indicative of a drag on the motor torque. The bandsaw motor drag detector 170 can transmit the motor drag signal 135 to the blade angle controller 36 which compares the motor drag signal 135 to a trigger value provided by an attribute application 250 to determine if a drive signal 50 is to be transmitted to the blade angle adjustment mechanism 32.

Figure 14:
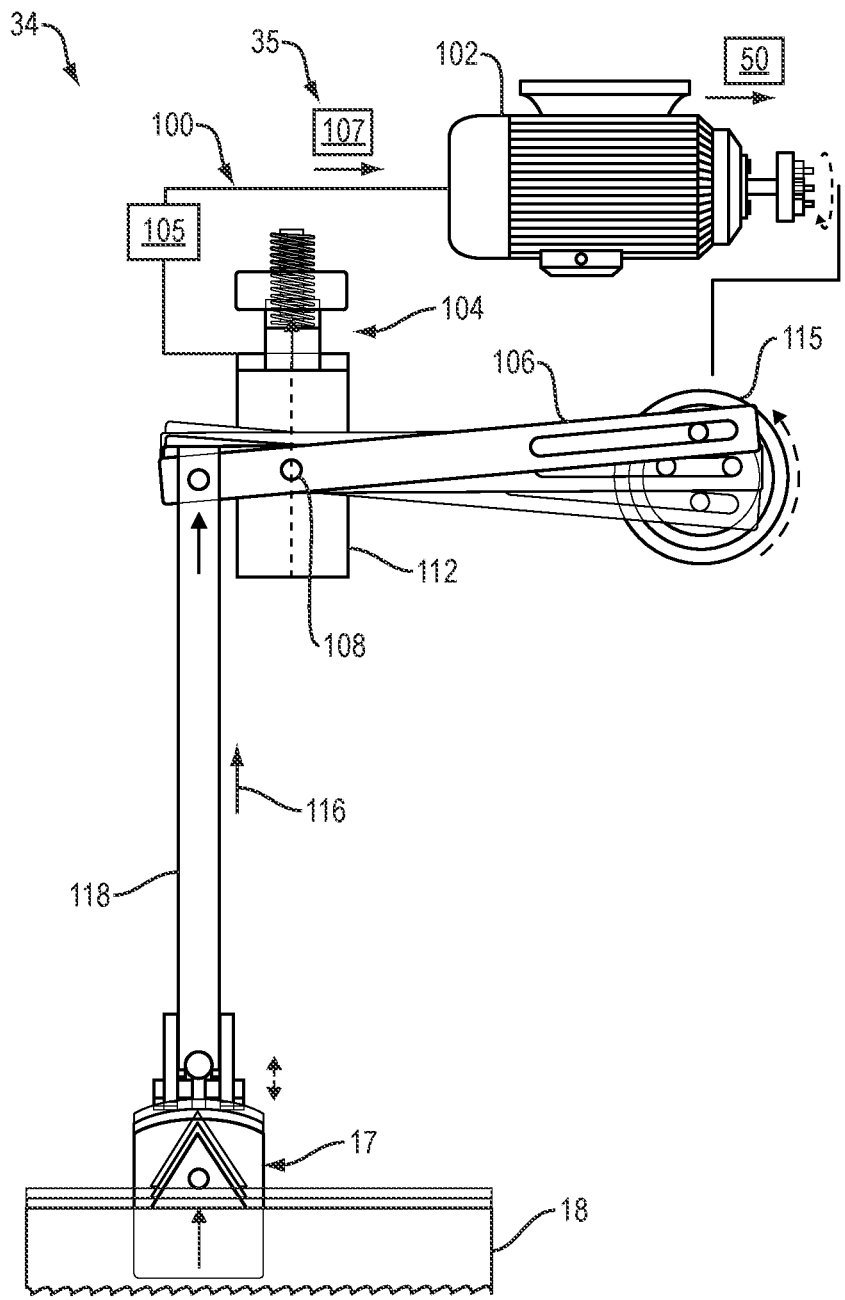
FIG. 14 illustrates a mechanical feedback system associated with the blade angle adjustment assembly, according to one arrangement.

In one arrangement, the tooth load indicator 34 can be configured as a mechanical actuation system 100 operate the blade angle adjustment mechanism 32. For example, as illustrated in FIG. 14, the mechanical actuation system 100 can include a motor 102 and a mechanical actuator 104 coupled to an electrical signal source 105. Actuation of the mechanical actuator 104 is configured to adjust operation of the electrical signal source 105 which, in turn, is configured to generate and transmit, as the tooth load indication signal 35, an electrical signal 105 to the motor 102. For example, the mechanical actuator 104 can be a stack of Bellville washers configured as an electrical switch while the electrical signal source 105 can be configured as a rheostat.

During operation, a pre-loaded blade guide element 17 contacts the bandsaw blade 18 as the bandsaw machine 10 advances the bandsaw blade 18 through a workpiece (not shown). As the bandsaw blade 18 experiences increasing cutting pressure, the pressure moves the pre-loaded blade guide element 17 vertically along direction 116. Such motion causes the connection arm 118 to generate a load on block 112 and displace the block 112 along direction 116 to activate the mechanical actuator 104. In response, the mechanical actuator 104 activates the electrical signal source 105 which sends electrical signal 105 to the motor 102. The value of the electrical signal 105 is proportional to the actuation of the mechanical actuator 104 and to the pressure experienced by the bandsaw blade 18. As a result, the motor generates a drive signal 50 to initiate rotation of a drive element 115 which, in turn, generate a wave motion in the drive arm 106 about pivot pin 108. This wave motion causes the connection arm 118 and the guide assembly 114 to oscillate at a frequency and amplitude corresponding to that of the drive arm 106.

While various embodiments of the innovation have been particularly shown and described, it will be understood by those skilled in the art that various changes in form and details may be made therein without departing from the spirit and scope of the innovation as defined by the appended claims.

What is claimed is:

1. A blade angle adjustment assembly, comprising:
   a blade angle adjustment mechanism;
   a sensor coupled to the blade angle adjustment mechanism; and
   a blade angle controller disposed in electrical communication with the blade angle adjustment mechanism and with the sensor, the blade angle controller comprising a processor and memory and the blade angle controller configured to:
      receive a sensor signal from the sensor,
      compare a sensor signal value of the sensor signal to a trigger value, and
      based upon the sensor signal, provide a drive signal to the blade angle adjustment mechanism to generate a rocking motion of a bandsaw blade relative to a workpiece to vary a cut path within a cut plane of the workpiece.

2. The blade angle adjustment assembly of claim 1, wherein when comparing the sensor signal value to the trigger value, the blade angle controller is configured to:
   compare the sensor signal to a trigger value of a series of trigger values having a corresponding series of drive values , and
   when the sensor signal value meets a trigger value of the series of trigger values, providing the corresponding drive signal to the blade angle adjustment mechanism, the series of trigger values and series of drive values corresponding to a machinability attribute of the workpiece.

3. The blade angel adjustment assembly of claim 1, wherein:
   the sensor comprises a pressure sensor coupled to the blade angle adjustment mechanism; and
   the sensor signal comprises a pressure signal.

4. The blade angle adjustment assembly of claim 3, wherein:
   the blade angle adjustment mechanism comprises a first blade angle adjustment mechanism and a second blade angle adjustment;
   the pressure sensor comprises a first pressure sensor coupled to the first blade angle adjustment mechanism and a second pressure sensor coupled to the second blade angle adjustment mechanism; and
   the blade angle controller comprises a processor and memory and is disposed in electrical communication with the first blade angle adjustment mechanism, the first pressure sensor, the second blade angle adjustment mechanism, and the pressure sensor, the blade angle controller configured to:
      receive a first pressure signal from the first pressure sensor and a second pressure signal from the second pressure sensor,
      based upon the first pressure signal and the second pressure signal, provide a first drive signal to the first blade angle adjustment mechanism to adjust an angular positon of a bandsaw blade within a cut plane of a workpiece to one of an upward or downward position and provide a second drive signal to the second blade angle adjustment mechanism to adjust an angular positon of a bandsaw blade within a cut plane of a workpiece to the other of the upward or downward position.

5. The blade angle adjustment assembly of claim 1, wherein:
   the sensor comprises a bandsaw motor drag detector; and
   the sensor signal comprises a motor drag signal.

6. The blade angle adjustment assembly of claim 1, wherein:
   the sensor comprises a mechanical actuator coupled to an electrical signal source, actuation of the mechanical actuator configured to adjust operation of the electrical signal source; and
   the sensor signal comprises an electrical signal generated by the electrical signal source.

7. The blade angle adjustment assembly of claim 1, wherein the blade angle adjustment mechanism comprises:
   a housing;
   a piston having a first end moveably disposed within the housing and a second end coupled to a blade guide element.

8. The blade angle adjustment mechanism of claim 7, further comprising a lever coupled between the second end of the piston and the blade guide element.

9. The blade angle adjustment assembly of claim 1, wherein the blade angle adjustment mechanism comprises a rotating asymmetric drive mechanism.

10. The blade angle adjustment assembly of claim 1, wherein the blade angle adjustment mechanism further comprises a rotating cam drive mechanism.

11. A bandsaw machine, comprising:
   a frame;
   a first saw blade guide arm carried by the frame;
   a second saw blade guide arm carried by the frame, the second saw blade guide arm spaced from the first saw blade guide arm;
   a bandsaw blade carried by the first saw blade guide arm and the second saw blade guide arm; and
   a blade angle adjustment assembly, comprising:
      a blade angle adjustment mechanism coupled to the frame;
      a sensor coupled to the blade angle adjustment mechanism; and
      a blade angle controller disposed in electrical communication with the blade angle adjustment mechanism and with the pressure sensor, the blade angle controller comprising a processor and memory and the blade angle controller configured to:
         receive sensor signal from the pressure sensor,
         compare a sensor signal value of the sensor signal to a trigger value, and
         based upon the sensor signal, provide a drive signal to the blade angle adjustment mechanism to generate a rocking motion of a bandsaw blade relative to a workpiece to vary a cut path within a cut plane of the workpiece.

12. The bandsaw machine of claim 11, wherein when comparing the sensor signal value to the trigger value, the blade angle controller is configured to:
   compare the sensor signal to a trigger value of a series of trigger values having a corresponding series of drive values , and
   when the sensor signal value meets a trigger value of the series of trigger values, providing the corresponding drive signal to the blade angle adjustment mechanism, the series of trigger values and series of drive values corresponding to a machinability attribute of the workpiece.

13. The bandsaw machine of claim 11, wherein:
the sensor comprises a pressure sensor coupled to the blade angle adjustment mechanism; and
the sensor signal comprises a pressure signal.

14. The bandsaw machine of claim 13, wherein:
the blade angle adjustment mechanism comprises a first a blade angle adjustment mechanism and a second blade angle adjustment;
the pressure sensor comprises a first pressure sensor coupled to the first blade angle adjustment mechanism and a second pressure sensor coupled to the second blade angle adjustment mechanism; and
the blade angle controller comprises a processor and memory and is disposed in electrical communication with the first blade angle adjustment mechanism, the first pressure sensor, the second blade angle adjustment mechanism, and the pressure sensor, the blade angle controller configured to:
receive a first pressure signal from the first pressure sensor and a second pressure signal from the second pressure sensor,
based upon the first pressure signal and the second pressure signal, provide a first drive signal to the first blade angle adjustment mechanism to adjust an angular positon of a bandsaw blade within a cut plane of a workpiece to one of an upward or downward position and provide a second drive signal to the second blade angle adjustment mechanism to adjust an angular positon of a bandsaw blade within a cut plane of a workpiece to the other of the upward or downward position.

15. The bandsaw machine of claim 11, wherein:
the sensor comprises a bandsaw motor drag detector; and
the sensor signal comprises a motor drag signal.

16. The bandsaw machine of claim 11, wherein:
the sensor comprises a mechanical actuator coupled to an electrical signal source, actuation of the mechanical actuator configured to adjust operation of the electrical signal source; and
the sensor signal comprises an electrical signal generated by the electrical signal source.

17. The bandsaw machine of claim 11, wherein the blade angle adjustment mechanism comprises:
a housing;
a piston having a first end moveably disposed within the housing and a second end coupled to a blade guide element.

18. The bandsaw machine of claim 17, further comprising a lever coupled between the second end of the piston and the blade guide element.

19. The bandsaw machine of claim 17, wherein the blade angle adjustment mechanism comprises a rotating asymmetric drive mechanism.

20. The bandsaw machine of claim 17, wherein the blade angle adjustment mechanism comprises a rotating cam drive mechanism.

21. The blade angle adjustment assembly of claim 1, wherein when generating the rocking motion of the bandsaw blade relative to the workpiece to vary the cut path within the cut plane of the workpiece, the blade angle controller is configured to provide a continuously variable area of tooth contact between the bandsaw blade and the workpiece.

22. The bandsaw machine of claim 11, wherein when generating the rocking motion of the bandsaw blade relative to the workpiece to vary the cut path within the cut plane of the workpiece, the blade angle controller is configured to provide a continuously variable area of tooth contact between the bandsaw blade and the workpiece.

* * * * *